(12) United States Patent
Kim et al.

(10) Patent No.: US 10,236,486 B2
(45) Date of Patent: Mar. 19, 2019

(54) RECHARGEABLE BATTERY PACK

(71) Applicant: Samsung SDI Co., Ltd., Yongin-si, Gyeonggi-do (KR)

(72) Inventors: Myung-Chul Kim, Yongin-si (KR); Ji-Soon Lim, Yongin-si (KR); Heon-Hee Kim, Yongin-si (KR); Jong-Hyun Lee, Yongin-si (KR)

(73) Assignee: Samsung SDI Co., Ltd., Gyeonggi-di (KR)

(*) Notice: Subject to any disclaimer, the term of this patent is extended or adjusted under 35 U.S.C. 154(b) by 190 days.

(21) Appl. No.: 15/249,236

(22) Filed: Aug. 26, 2016

(65) Prior Publication Data

US 2017/0062783 A1   Mar. 2, 2017

(30) Foreign Application Priority Data

Aug. 28, 2015 (KR) .......................... 10-2015-0121991

(51) Int. Cl.
| | |
|---|---|
| *H01M 2/10* | (2006.01) |
| *H01M 10/04* | (2006.01) |
| *H01M 10/052* | (2010.01) |

(52) U.S. Cl.
CPC ....... *H01M 2/1077* (2013.01); *H01M 2/1016* (2013.01); *H01M 2/1061* (2013.01);
(Continued)

(58) Field of Classification Search
CPC .......................... H01M 2/1077; H01M 2/1016
See application file for complete search history.

(56) References Cited

U.S. PATENT DOCUMENTS

| | | |
|---|---|---|
| 2009/0311594 A1 | 12/2009 | Uh |
| 2011/0104552 A1 | 5/2011 | Kim et al. |

(Continued)

FOREIGN PATENT DOCUMENTS

| | | |
|---|---|---|
| KR | 10-0983200 B1 | 9/2010 |
| KR | 10-2011-0049655 A | 5/2011 |

(Continued)

OTHER PUBLICATIONS

Korean Office Action dated Apr. 27, 2017 for Korean Patent Application No. KR 10-2015-0121991, from which subject U.S. Appl. No. 15/249,236 claims priority.

(Continued)

*Primary Examiner* — Matthew J Merkling
(74) *Attorney, Agent, or Firm* — Knobbe Martens Olson & Bear LLP (57) ABSTRACT

A rechargeable battery pack is disclosed. In one aspect, the rechargeable battery pack includes multiple a plurality of sets of unit cells adjacently placed to each other, wherein each unit cell includes a rechargeable battery and a plurality of rechargeable battery modules each configured to electrically connect a corresponding set of the unit cells to each other, wherein each rechargeable battery module includes a pair of end plates respectively placed on outermost opposing sides thereof. The rechargeable battery pack also includes a coupling member connecting the end plates of the rechargeable battery modules to each other. Each of the end plates includes a first flange having a first width and extending from a bent portion of a main body to be fastened to the coupling member and a second flange having a second width smaller than the first width and extending from a middle portion of the first flange.

20 Claims, 10 Drawing Sheets

(52) U.S. Cl.
CPC ......... *H01M 10/04* (2013.01); *H01M 10/052* (2013.01); *H01M 2220/20* (2013.01)

(56) References Cited

U.S. PATENT DOCUMENTS

| | | | |
|---|---|---|---|
| 2011/0117409 A1 | 5/2011 | Lee et al. | |
| 2011/0159348 A1* | 6/2011 | Park | H01M 2/1077 429/151 |
| 2011/0262797 A1 | 10/2011 | Kim | |
| 2011/0262799 A1 | 10/2011 | Kim | |
| 2012/0040237 A1 | 2/2012 | Hamada et al. | |
| 2012/0058389 A1 | 3/2012 | Guen | |
| 2012/0177969 A1* | 7/2012 | Jin | H01M 2/1077 429/120 |
| 2013/0288094 A1* | 10/2013 | Noh | H01M 2/1077 429/99 |
| 2014/0030566 A1* | 1/2014 | Lee | H01M 2/1016 429/90 |
| 2015/0024253 A1 | 1/2015 | Noh | |
| 2015/0064542 A1* | 3/2015 | Noh | H01M 2/1016 429/156 |

FOREIGN PATENT DOCUMENTS

| | | | |
|---|---|---|---|
| KR | 10-2011-0053713 A | 5/2011 | |
| KR | 10-2012-0007009 A | 1/2012 | |
| KR | 10-2012-0025854 A | 3/2012 | |
| KR | 10-2014-0011207 A | 1/2014 | |
| KR | 10-2014-0076857 A | 6/2014 | |
| KR | 10-2015-0010226 A | 1/2015 | |

OTHER PUBLICATIONS

Extended European Search Report dated Nov. 14, 2016 for European Patent Application No. EP 16 186 031.7, which corresponds to subject U.S. Appl. No. 15/249,236.

* cited by examiner

RECHARGEABLE BATTERY PACK

CROSS-REFERENCE TO RELATED APPLICATION

This application claims priority to and the benefit of Korean Patent Application No. 10-2015-0121991 filed in the Korean Intellectual Property Office on Aug. 28, 2015, the entire contents of which are incorporated herein by reference.

BACKGROUND

Field

The described technology generally relates to a rechargeable battery pack.

Description of the Related Technology

A rechargeable battery (unlike a primary battery) can be repeatedly charged and discharged. Low-capacity rechargeable batteries are used in small portable electronic devices such as mobile phones, notebook computers, and camcorders, while high-capacity rechargeable batteries can be used as a power source for driving motors of a hybrid vehicle, an electric vehicle, and the like.

The rechargeable battery may be used in small electronic devices as a single cell battery or in motor-driving power sources, etc. as a battery module in which multiple battery cells are electrically connected or as a battery pack in which multiple battery modules are electrically connected.

SUMMARY OF CERTAIN INVENTIVE ASPECTS

One inventive aspect relates to a rechargeable battery pack in which a plurality of rechargeable battery modules including a plurality of unit cells are connected to each other.

Another aspect is a rechargeable battery pack in which a deformation amount of an end plate due to a cell swelling force is a maximum at a center portion of the end plate, and gradually decreases from the center portion toward an outer side.

Another aspect is a rechargeable battery pack including: unit cells that are respectively formed of a rechargeable battery and adjacently disposed to each other; rechargeable battery modules in which the unit cells are electrically connected and outermost opposite sides of which are respectively provided with an end plate; and a coupling member connecting the adjacent end plates of the rechargeable battery modules to each other, wherein the end plate may include: a main body oriented toward an outermost unit cell among the unit cells; a bent portion that is bent at least once in the main body; a first flange that is bent with a first width at the bent portion to be fastened to the coupling member; and a second flange that is bent with a second width smaller than the first width at the bent portion of a side portion of the first flange.

The end plate may include: a first fastening member that is fixed to the first flange to be coupled to the coupling member; and a handling hole formed to pass through the main body at one side of the first fastening member.

The end plate may include: an eleventh bent line that is bent at the bent portion to form the first flange and the second flange; a twelfth bent line that is formed between the main body and the bent portion; and a thirteenth bent line that is bent in a direction opposite to a bent direction of the eleventh and twelfth bent lines at the bent portion between the eleventh and twelfth bent lines.

The eleventh bent line and the twelfth bent line may be bent in a direction away from the unit cell, and the thirteenth bent line may be bent in a direction parallel to the unit cell.

The main body may be provided with a reinforcing rib that is extended in a direction parallel to the first flange and the second flange and is protruded in a direction away from the unit cell.

The reinforcing rib may be provided in plural to be disposed to be spaced apart from each other in a height direction of the main body.

A reinforcing rib adjacent to the first flange and the second flange among the reinforcing ribs may be formed at opposite sides thereof to be shorter than the remaining reinforcing ribs by a length difference therebetween.

The end plate may include: a bottom flange that is bent in a direction away from the outermost unit cell at a lower portion of the main body to face the first flange and the second flange to be fixed to a module side plate; and side flanges that are bent in a direction away from the outermost unit cell at opposite sides of the main body to face each other to be fixed to a module side plate.

The bottom flange may include an elastic portion that is vertically bent to be vertically deformed.

The end plate may include an edge-reinforcing rib that is protruded from an edge at which the main body and the bottom flange are bent and connected to support the main body and the bottom flange.

Another aspect is a rechargeable battery pack comprising: a plurality of sets of unit cells adjacent to each other, wherein each unit cell includes a rechargeable battery; a plurality of rechargeable battery modules each configured to electrically connect a corresponding set of the unit cells to each other, wherein each of the rechargeable battery modules includes a pair of end plates respectively placed on outermost opposing sides thereof; and a coupling member connecting the end plates of the rechargeable battery modules to each other. Each of the end plates includes: a main body oriented toward an outermost unit cell among the unit cells of the respective rechargeable battery module; a bent portion having at least one bend away from a side of the main body; a first flange having a first width and extending from the bent portion to be connected to the coupling member; and a second flange having a second width smaller than the first width and extending from a middle portion of the first flange.

In the above rechargeable battery pack, each of the end plates includes: a first fastening member fixed to the first flange to be coupled to the coupling member; and a handling hole formed to pass through the main body at one side of the first fastening member.

In the above rechargeable battery pack, the coupling member has a plurality of fastening holes respectively formed over the first fastening members of the respective rechargeable battery module, wherein the rechargeable battery pack further comprises a plurality of second fastening members configured to couple the coupling member to the rechargeable battery modules together with the first fastening members.

In the above rechargeable battery pack, each of the first fastening members is a bolt passing through the respective fastening hole to be connected to the corresponding second fastening member.

In the above rechargeable battery pack, each of the second fastening members is a bolt passing through the respective fastening hole to be connected to the corresponding first fastening member.

In the above rechargeable battery pack, the coupling member is perpendicular to the battery modules.

In the above rechargeable battery pack, the end plate includes: a first bent line having a bend at the bent portion to form the first and second flanges; a second bent line formed between the main body and the bent portion; and a third bent line having a bend in a direction opposite to a bent direction of the first and second bent lines at the bent portion between the first and second bent lines.

In the above rechargeable battery pack, the first and second bent lines are bent in a direction away from the corresponding unit cell, wherein the third bent line is bent in a direction parallel to the unit cell.

In the above rechargeable battery pack, the main body includes a reinforcing rib extending in a direction parallel to the first flange and the second flange and protrudes in a direction away from the unit cell.

In the above rechargeable battery pack, the reinforcing rib is provided in plural to be spaced apart from each other in a height direction of the main body.

In the above rechargeable battery pack, a reinforcing rib adjacent to the first and second flanges is formed at opposite sides thereof to be shorter than the remaining reinforcing ribs by a length difference therebetween.

In the above rechargeable battery pack, each of the end plates includes: a bottom flange bent in a direction away from the outermost unit cell at a lower portion of the main body to face the first and second flanges to be fixed to a module side plate; and a plurality of side flanges bent in a direction away from the outermost unit cell at opposite sides of the main body to face each other to be fixed to the module side plate.

In the above rechargeable battery pack, the bottom flange includes a vertically bent elastic portion.

In the above rechargeable battery pack, the end plate includes an edge-reinforcing rib protruding from an edge at which the main body and the bottom flange are bent and connected to support the main body and the bottom flange.

Another aspect is a rechargeable battery pack comprising: a plurality of rechargeable battery modules each configured to electrically connect a plurality of unit cells to each other, wherein each of the rechargeable battery modules includes a pair of end plates respectively placed on outermost opposing sides thereof; and a coupler connecting the rechargeable battery modules to each other via the end plates. Each of the end plates includes: a main body; a first upper portion extending from the main body at least partially in a first direction; and a second upper portion extending from the first portion in a second direction crossing the first direction, wherein the second upper portion directly contacts and is connected to the coupler.

In the above rechargeable battery pack, the first upper portion of each end plate includes a bent portion bent at an angle with respect to the main body.

In the above rechargeable battery pack, the second upper portion includes: a first flange having a first width and extending in the second direction, a second flange having a second width and extending from a middle portion of the first flange in the second direction, wherein the second width is smaller than the first width.

In the above rechargeable battery pack, an opening is formed in the second flange of each end plate, and wherein the end plates are connected to the coupler via the openings.

In the above rechargeable battery pack, the main body includes a reinforcing rib extending in a direction parallel to the first and second flanges and protrudes in a direction away from the unit cell.

In the above rechargeable battery pack, the reinforcing rib is provided in plural to be spaced apart from each other in a height direction of the main body.

According to at least one of the disclosed embodiments, when the end plates are provided at the opposite sides of the outermost portion of the unit cells forming the rechargeable battery module, the bent portion is formed in the main body of the end plate, the first and second flanges are provided at the bent portion, and the first flange is fastened to the coupling member, and since the second flange mechanically strengthens the end plate and allows a tool to be able to be handled, the deformation amount of the end plate due to the cell swelling force may be a maximum at the center portion of the end plate.

Furthermore, the deformation amount of the end plate due to the cell swelling force may gradually decrease from the center portion toward the outside. Accordingly, in spite of the cell swelling force, the electrical connection structure of the bus bars with respect to the unit cells of the unit module and the fastening structure of the coupling members with respect to the end plates of the unit module of the rechargeable battery pack may be respectively stabilized.

DETAILED DESCRIPTION OF CERTAIN INVENTIVE EMBODIMENTS

A rechargeable battery module typically includes an end plate at an outermost side of the unit cells to provide structural support. The rechargeable battery pack is formed by fastening the end plates of the rechargeable battery modules with coupling members.

The end plate is provided with an upper flange bent in a main body facing the unit cell, and the upper flange can include a nut or bolt so as to fasten it to the coupling member. Therefore, space to allow a tool for fastening the upper flange and the coupling member is required.

For example, the upper flange is formed only in an upper central portion of the end plate, and is not formed in opposite sides of the upper central portion. Accordingly, the upper portion of the end plate generally has low mechanical strength.

Figure 10:
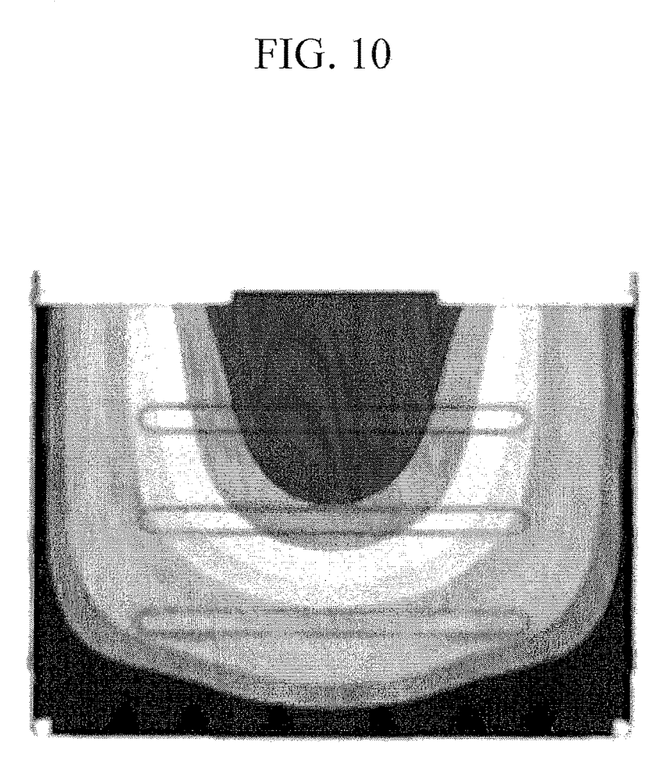
FIG. 10 illustrates a distribution diagram of a cell swelling force in an end plate.

When swelling occurs in the unit cell of the rechargeable battery pack (as shown in FIG. 10), force is concentrated on the upper portion of the end plate. Due to the cell swelling force, the deformation of the end plate is a maximum at the upper center of the end plate, gradually decreases toward opposite sides from the upper center, and gradually decreases toward a lower portion of the end plate from the upper portion thereof.

As the amount of the end plate deformation is a maximum at the upper center of the end plate, an electrically connecting structure of bus bars with respect to the unit cells and a fastening structure of the coupling members with respect to the end plates of the unit module can be deformed and damaged.

Embodiments will be described more fully hereinafter with reference to the accompanying drawings. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 1:
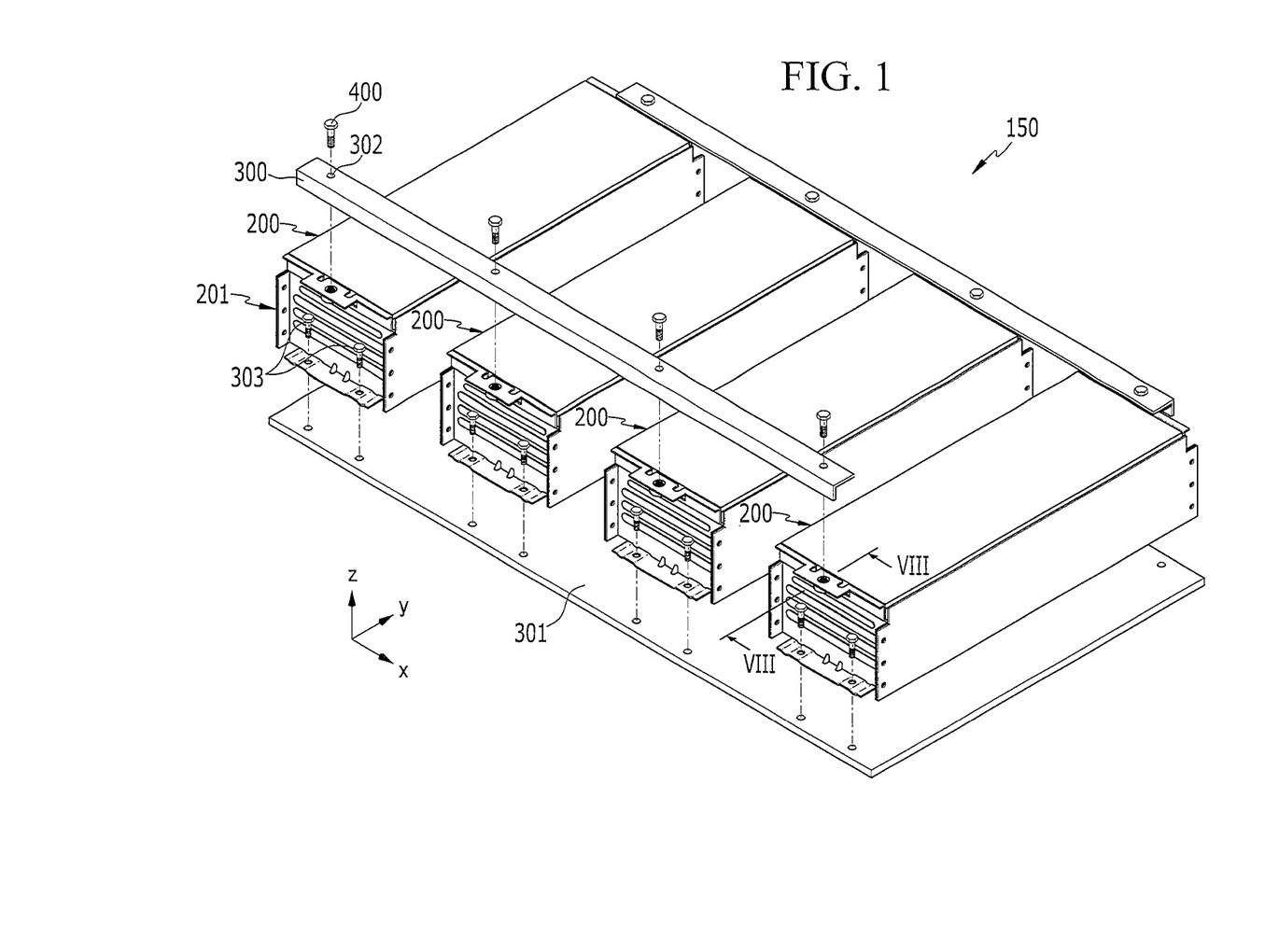
FIG. 1 illustrates an exploded perspective view of a rechargeable battery pack according to an exemplary embodiment.
Figure 2:
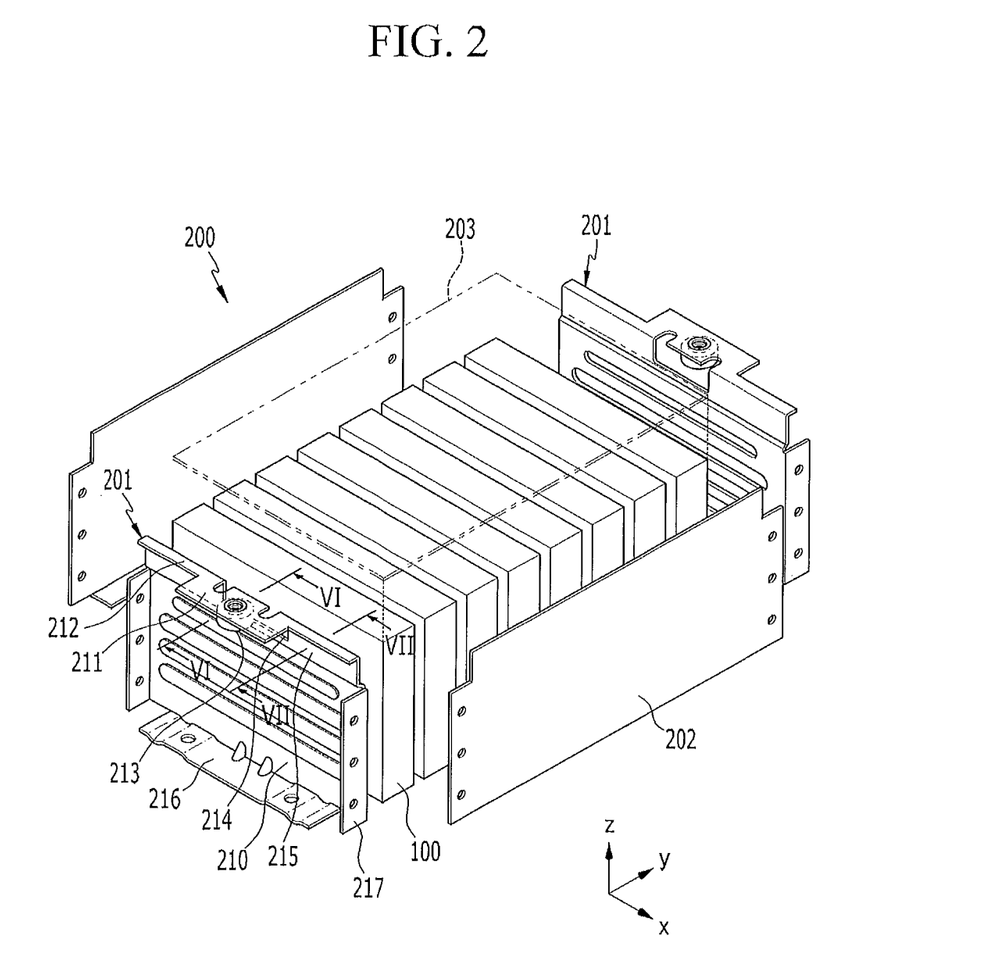
FIG. 2 illustrates an exploded perspective view of a rechargeable battery module applied to FIG. 1.

FIG. 1 illustrates an exploded perspective view of a rechargeable battery pack 150 according to an exemplary embodiment, and FIG. 2 illustrates an exploded perspective view of rechargeable battery modules 200 applied to FIG. 1. Referring to FIGS. 1 and 2, the rechargeable battery pack 150 includes a plurality of sets of unit cells 100 each unit cell 100 including a rechargeable battery, a plurality of rechargeable battery modules 200 each electrically connecting the corresponding set of unit cells 100, and a coupling member 300 mechanically connecting the rechargeable battery modules 200 to each other.

The respective set of unit cells 100 are disposed to be adjacent in a y-axis direction, and are mechanically and electrically connected to each other in the respective rechargeable battery module 200. The rechargeable battery module 200 includes an end plate 201 supporting the unit cells 100 at outermost opposite sides of the unit cells 100.

Although not illustrated, the rechargeable battery module can include an insulating member between the outermost unit cell and the end plate. In this case, the end plate substantially supports the insulating member.

The rechargeable battery modules 200 are disposed to be adjacent in an x-axis direction, and are mechanically and electrically connected to each other to form the rechargeable battery pack. In the rechargeable battery pack, the coupling member 300 is extendedly disposed in the x-axis direction, and connects the adjacent end plates 201 of the rechargeable battery modules 200 to each other.

The rechargeable battery module 200 includes a module side plate 202 surrounding opposite sides and one portion of a bottom side of the unit cells 100, and a cover 203 covering the unit cells 100 and coupled to the module side plate 202 (the coupled structure is not shown).

The end plate 201 is disposed at opposite sides of the y-axis direction of the rechargeable battery module 200, and is fixed to the module side plate 202 surrounding the bottom side and the opposite sides of the unit cells 100. In addition, the cover 203 is coupled to the module side plate 202, such that the rechargeable battery module 200 is formed.

The rechargeable battery pack includes a pack bottom plate 301 on which the rechargeable battery modules 200 are disposed. The end plate 201 is fixed to the pack bottom plate 301.

Figure 3:
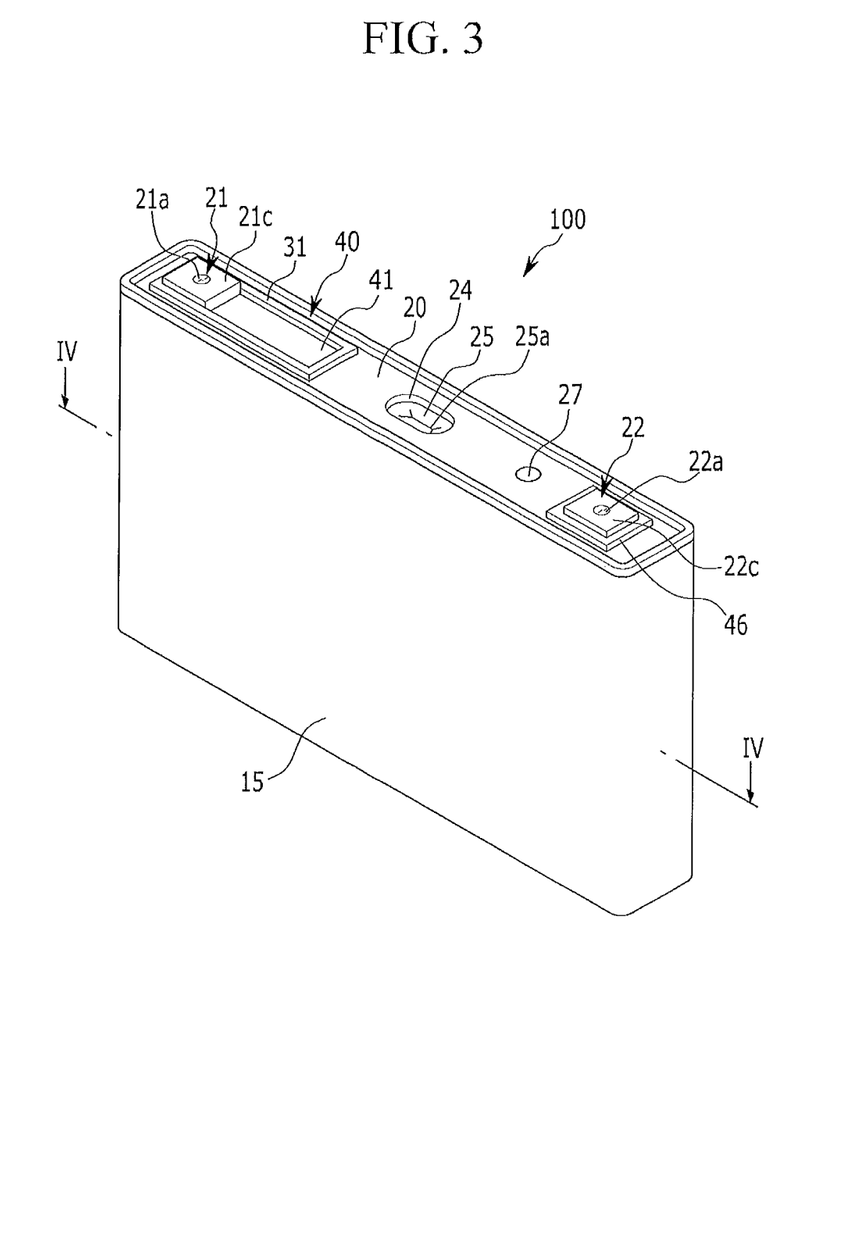
FIG. 3 illustrates a perspective view of a unit cell applied to FIG. 2.
Figure 4:
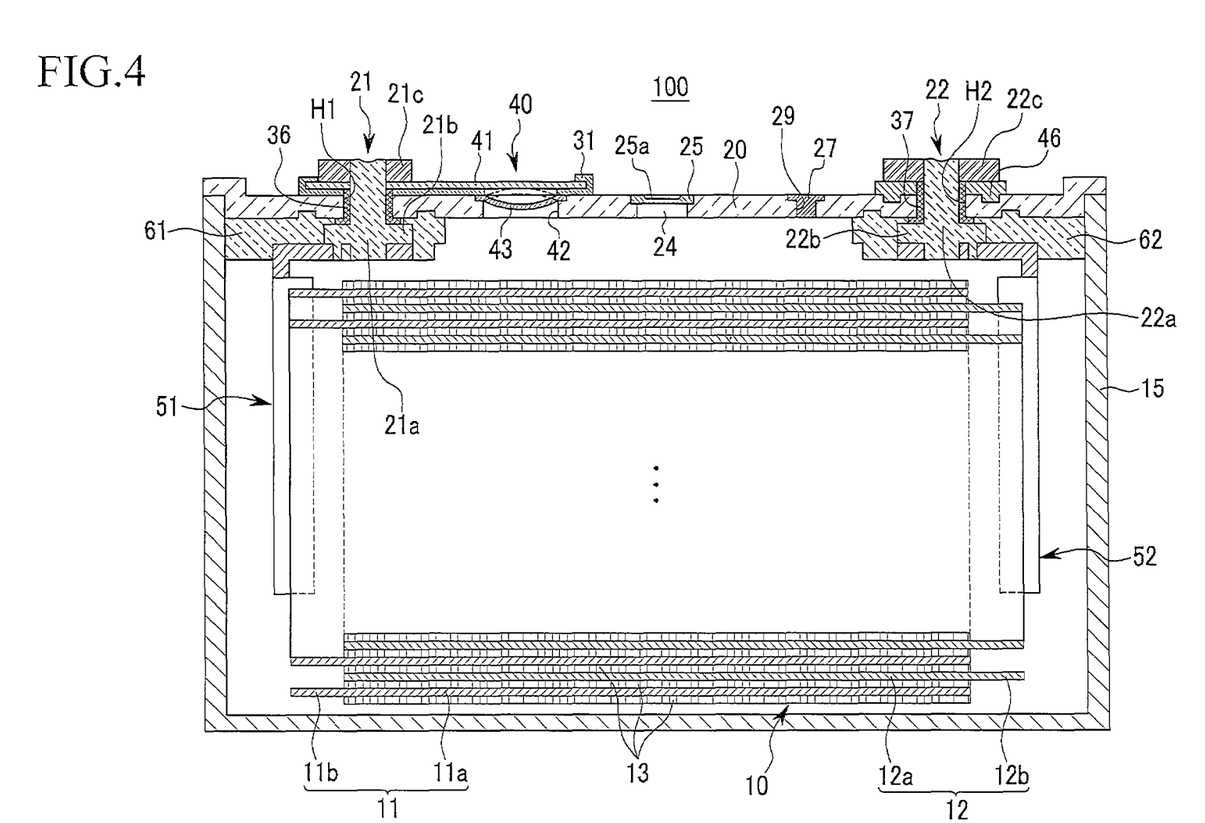
FIG. 4 illustrates a cross-sectional view of FIG. 3 taken along line IV-IV.

FIG. 3 illustrates a perspective view of a unit cell applied to FIG. 2, and FIG. 4 illustrates a cross-sectional view of FIG. 3 taken along line IV-IV. Referring to FIGS. 3 and 4, the unit cell 100 includes an electrode assembly 10 charging and discharging a current, a case 15 accommodating the electrode assembly 10, a cap plate 20 coupled to an opening of the case 15, a negative terminal 21 and a positive terminal 22 installed on the cap plate 20 and an external short-circuit portion 40 that is provided at the negative electrode terminal 21.

For example, a negative electrode 11 and a positive electrode 12 are disposed at opposite sides of a separator 13, which is an insulator, and the positive electrode 12, the negative electrode 11, and the separator 13 are spirally wound in a jelly-roll state to form the electrode assembly 10.

The positive and negative electrodes 11 and 12 respectively include coated regions 11a and 12a where an active material is coated on current collectors made of a metal plate, and uncoated regions 11b and 12b where an active material is not coated thereon and which are formed as exposed current collectors.

The uncoated region 11b of the negative electrode 11 is formed at one end portion of the negative electrode 11 along the wound negative electrode 11. The uncoated region 12b of the positive electrode 12 is formed at one end portion of the positive electrode 12 along the wound positive electrode 12. Thus, the uncoated regions 11b and 12b are respectively disposed at opposite end portions of the electrode assembly 10.

For example, the case 15 is substantially formed as a cuboid in which a space for accommodating the electrode assembly 10 and an electrolyte solution is set, and is formed with the opening for connecting inner and outer spaces at one side of the cuboid. The opening allows the electrode assembly 10 to be inserted into the case 15.

The cap plate 20 is installed at the opening of the case 15 to seal the case 15. The case 15 and the cap plate 20 may be formed of aluminum and can be welded to each other.

In addition, the cap plate 20 is provided with an electrolyte injection opening 29, a vent hole 24, and terminal holes H1 and H2. After combining the cap plate 20 to the case 15, the electrolyte injection opening 29 allows the electrolyte solution to be injected into the case 15. After being injected with the electrolyte solution, the electrolyte injection opening 29 is sealed with a sealing cap 27.

The vent hole 24 is sealed with a vent plate 25 so as to discharge internal pressure of the unit cell 100. The vent plate 25 is ruptured to open the vent hole 24 when the internal pressure of the unit cell 100 reaches a predetermined pressure. The vent plate 25 is provided with a notch 25a that induces the rupture.

The negative and positive terminals 21 and 22 are provided in the terminal holes H1 and H2 of the cap plate 20, and are electrically coupled to the electrode assembly 10. For example, the negative terminal 21 is electrically coupled to the negative electrode 11 of the electrode assembly 10, while the positive terminal 22 is electrically coupled to the positive electrode 12 of the electrode assembly 10. Thus, the electrode assembly 10 is drawn out of the case 15 through the negative and positive terminals 21 and 22.

Since the negative and positive terminals 21 and 22 have the same structure inside of the cap plate 20, the same structure will be described together. Since the negative and positive terminals 21 and 22 have different structures from each other outside of the cap plate 20, the different structures will be separately described.

The negative and positive terminals 21 and 22 include rivet terminals 21a and 22a that are respectively installed at the terminal holes H1 and H2 of the cap plate 20, flanges 21b and 22b that are widely formed inside of the cap plate 20 while being integrally formed with the rivet terminals 21a and 22a, and plate terminals 21c and 22c that are connected to the rivet terminals 21a and 22a by being riveted or welded while being disposed outside of the cap plate 20.

Negative and positive gaskets 36 and 37 are respectively provided between the rivet terminals 21a and 22a of the negative and positive terminals 21 and 22 and the inner sides of the terminal holes H1 and H2 to seal and electrically insulate between the rivet terminals 21a and 22a of the negative and positive terminals 21 and 22 and the cap plate 20.

The negative and positive electrode gaskets 36 and 37 are provided so that they are further extended between the flanges 21b and 22b and the inner side of the cap plate 20, and further seal and electrically insulate between the flanges 21b and 22b and the cap plate 20. That is, by installing the negative and positive terminals 21 and 22 at the cap plate 20, the negative and positive electrode gaskets 36 and 37 prevent leakage of the electrolyte solution through the terminal holes H1 and H2.

Negative and positive electrode lead tabs 51 and 52 allow the negative and positive terminals 21 and 22 to be electrically connected to the positive and negative electrodes 11 and 12, respectively. That is, by combining the negative and positive electrode lead tabs 51 and 52 with lower end portions of the rivet terminals 21a and 22a and then caulking the lower end portions, the negative and positive electrode lead tabs 51 and 52 are supported by the flanges 21b and 22b and are connected to the lower end portions of the rivet terminals 21a and 22a.

Negative and positive insulating members 61 and 62 are respectively installed between the negative and positive electrode lead tabs 51 and 52 and the cap plate 20 to electrically insulate therebetween. Further, the negative and positive insulating members 61 and 62 are combined to the cap plate 20 at one side thereof, and enclose the negative and positive electrode lead tabs 51 and 52, the rivet terminals 21a and 22a, and the flanges 21b and 22b at the other side thereof, thereby stabilizing a connecting structure between them.

The external short-circuit portion 40 will be described in connection with the plate terminal 21c of the negative terminal 21, and a top plate 46 will be described in connection with the plate terminal 22c of the positive terminal 22.

The external short-circuit portion 40 adjacent to the negative electrode terminal 21 includes a short-circuit tab 41 and a short-circuit member 43 that are separated or short-circuited depending on the internal pressure of the unit cell 100. The short-circuit tab 41 is disposed outside of the cap plate 20 while being electrically coupled to the rivet terminal 21a of the negative terminal 21 and interposing an insulating member 31.

The insulating member 31 is disposed between the short-circuit tab 41 and the cap plate 20 to insulate the short-circuit tab 41 from the cap plate 20. For example, the cap plate 20 maintains an electrically insulated state with the negative terminal 21.

By combining the short-circuit tab 41 and the plate terminal 21c with an upper end portion of the rivet terminal 21a and then caulking the upper end portion of the rivet terminal 21a, the short-circuit tab 41 and the plate terminal 21c are fastened to the upper end portion of the rivet terminal 21a. Thus, the short-circuit tab 41 and the plate terminal 21c are fastened to the cap plate 20 while interposing the insulating member 31 therebetween.

The short-circuit member 43 is installed at a short-circuit hole 42 that is formed at the cap plate 20. While being connected to the negative terminal 21, the short-circuit tab 41 is disposed to extend along the short-circuit member 43. Thus, the short-circuit tab 41 and the short-circuit member 43 correspond to the short-circuit hole 42, face each other to maintain a separated state therebetween (solid line state), and may form a short-circuit state (imaginary line state) in which the short-circuit member 43 is inversely deformed when the internal pressure of the unit cells 100 increases.

The top plate 46 adjacent to the positive terminal 22 electrically couples the plate terminal 22c of the positive terminal 22 and the cap plate 20. For example, the top plate 46 is interposed between the plate terminal 22c and the cap plate 20, and is penetrated by the rivet terminal 22a.

Thus, by combining the top plate 46 and the plate terminal 21c with an upper end portion of the rivet terminal 21a and then caulking the upper end portion of the rivet terminal 21a, the top plate 46 and the plate terminal 21c are fastened to the upper end portion of the rivet terminal 21a. The plate terminal 22c is installed outside of the cap plate 20 while interposing the top plate 46 therebetween.

The positive electrode gasket 37 is installed such that it further extends between the rivet terminal 22a and the top plate 46. That is, the positive electrode gasket 37 prevents the rivet terminal 22a and the top plate 46 from being directly electrically connected to each other. For example, the rivet terminal 22a is electrically connected to the top plate 46 through the plate terminal 22c.

Figure 5:
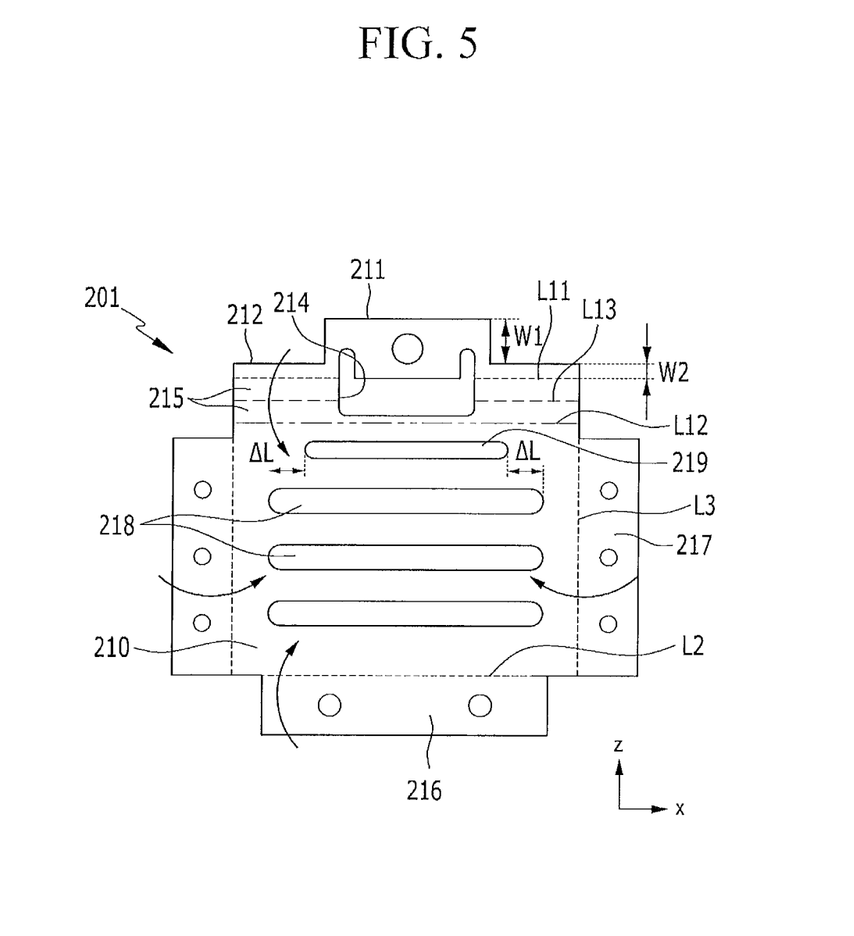
FIG. 5 illustrates an unfolded schematic diagram of an end plate applied to FIG. 2.
Figure 6:
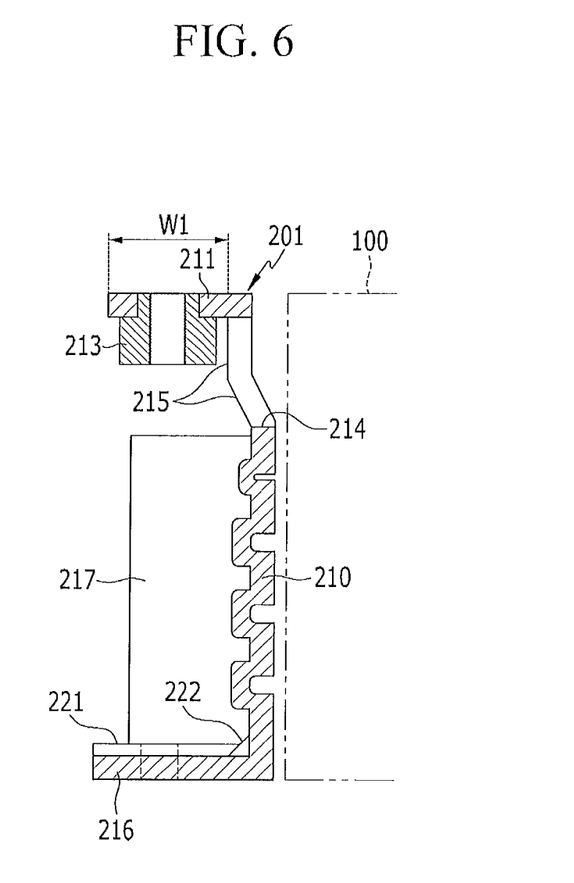
FIG. 6 illustrates a cross-sectional view of FIG. 2 taken along line VI-VI.
Figure 7:
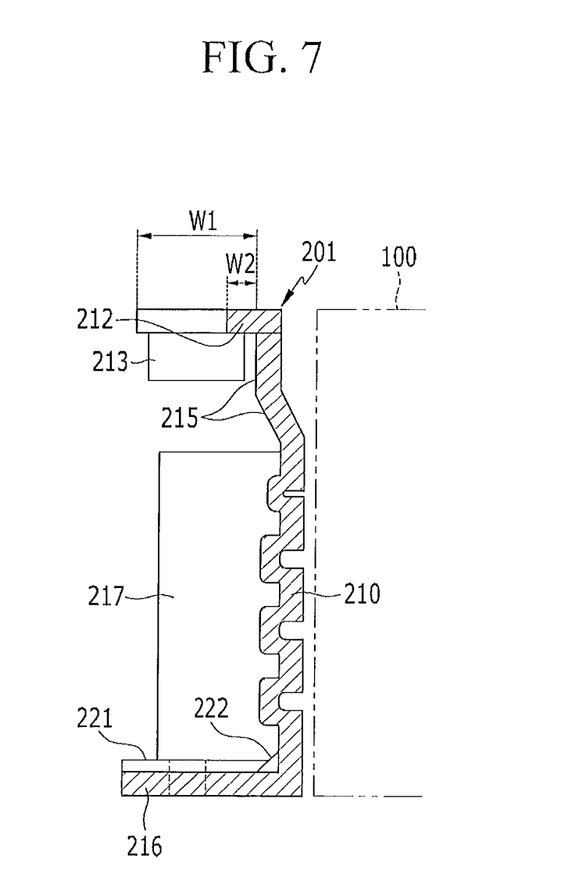
FIG. 7 illustrates a cross-sectional view of FIG. 2 taken along line VII-VII.

FIG. 5 illustrates an unfolded schematic diagram of an end plate applied to FIG. 2, FIG. 6 illustrates a cross-sectional view of FIG. 2 taken along line VI-VI, and FIG. 7 illustrates a cross-sectional view of FIG. 2 taken along line VII-VII.

Referring to FIG. 2 and FIGS. 5 to 7, the end plate 201 is provided with a main body 210, a bent portion or first upper portion 215, and first and second flanges 211 and 212 that are formed by bending the end plate 201. In addition, the end plate 201 is provided with a first fastening member 213 fastened to the first flange 211 and a handling hole 214 formed by cutting one portion of the bent portion 215.

The main body 210 is disposed toward the outermost one of unit cells 100 disposed to be adjacent in a y-axis direction. For example, the main body 210 supports the unit cells 100 of opposite sides of the rechargeable battery module 200 at the outermost portion of the rechargeable battery module 200.

The bent portion 215 improves mechanical strength of the end plate 201 with respect to a cell swelling force applied to a portion bent at least once in the main body 210. For example, the bent portion 215 is formed to be bent on a top portion of the main body 210, and the first and second flanges 211 and 212 are formed to be bent at an end portion of the bent portion 215.

For example, the first flange 211 is bent with a first width W1 at the bent portion 215 to be connected thereto. The second flange 212 is bent with a second width W2 at the bent portion 215 of side portions of the first flange 211 to be connected thereto. The second width W2 can be smaller than the first width W1. The first and second flanges 211 and 212 can form a second upper portion extending from the first upper portion in a crossing direction (e.g., perpendicular direction).

In some embodiments, as the second width W2 of the second flange 212 increases, although the mechanical strength of the end plate 201 with respect to the cell swelling force increases, since it is difficult to handle a tool for fastening the coupling member 300 to the first flange 211, the second width W2 should increase in a range in which the tool may be handled.

The end plate 201 connects the bent portion 215 to the main body 210, and is bent so that the first and second flanges 211 and 212 are connected to the bent portion 215. For example, the end plate 201 is provided with an eleventh or first bent line L11, a twelfth or second bent line L12, and a thirteenth or third bent line L13 in connection with the bent portion 215.

The eleventh bent line L11 is bent at an upper portion of the bent portion 215 to form the first and second flanges 211 and 212 connected to the bent portion 215. The twelfth bent line L12 is bent at the main body 210 to form the bent portion 215 connected to the main body 210.

The thirteenth bent line L13 is bent in a direction opposite to a bent direction of the eleventh and twelfth bent lines L11 and L12 at the bent portion 215 between the eleventh and twelfth bent lines L11 and L12 to divide the bent portion 215 in up and down directions.

For example, the eleventh and twelfth bent lines L11 and L12 are bent in a direction away from the unit cell 100, and the thirteenth bent line L13 is bent in a direction parallel to the unit cell 100.

The thirteenth bent line L13 can prevent the bent portion 215 and the first and second flanges 211 and 212 from being exceedingly away from the main body 210 in the end plate 201, and may improve the mechanical strength of the end plate 201.

The bent portion 215 and the eleventh, twelfth, and thirteenth bent lines L11, L12, and L13 reinforce the strength of the main body 210 with respect to the cell swelling force of the unit cells 100 between the main body 210 and the first and second flanges 211 and 212.

Although not illustrated, the bent portion 215 may be provided with a greater number of bent lines, and in this case, the strength of the main body 210 with respect to the swelling force may be further reinforced. The bent portion 215 may be bent in a direction adjacent to the unit cell 100, a direction away from the unit cell 100, or both directions.

The first flange 211 is bent at the bent portion 215 to face the coupling member 300 in a z-axis direction. The first fastening member 213 is fixedly coupled to a fastening hole of the first flange 211 to reinforce the strength of the first flange 211 and to be coupled to the coupling member 300 of the rechargeable battery pack (refer to FIGS. 1 and 8).

When the first flange 211 and the coupling member 300 that face each other are coupled, the first fastening member 213 improves a fastened force of the first flange 211 and the coupling member 300. The first fastening member 213 may be welded or clinched to the first flange 211.

Since the handling hole 214 is formed to pass through the bent portion 215 at one side of the first fastening member 213, a range in which the first fastening member 213 is installed in the first flange 211 is enlarged. For example, the handling hole 214 provides a space of a y-axis direction that is not limited by the bent portion 215, thus the first fastening member 213 for reinforcing the strength of the first flange 211 may be smoothly installed in the first flange 211.

Figure 8:
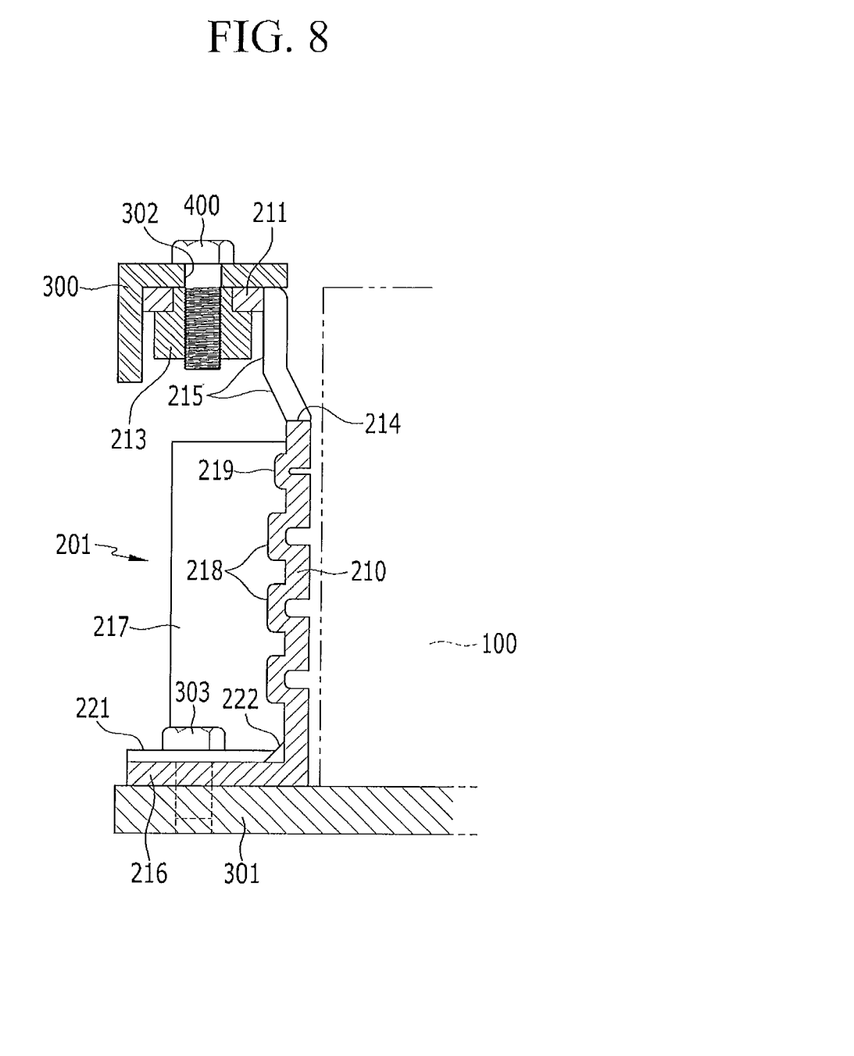
FIG. 8 illustrates a cross-sectional view of FIG. 1 taken along line VIII-VIII.

FIG. 8 illustrates a cross-sectional view of FIG. 1 taken along line VIII-VIII. Referring to FIGS. 1 and 8, the rechargeable battery pack further includes a second fastening member 400 that connects the coupling member 300 and the first fastening member 213 to each other.

The coupling member 300 is disposed on the first flange 211 of the end plate 201 to integrally combine the rechargeable battery modules 200. In this case, the second fastening member 400 is connected to the first fastening member 213 of the first flange 211 through a fastening hole 302 of the coupling member 300.

Referring to FIGS. 2, 6, and 8, the first fastening member 213 is fastened to the first flange 211, and is formed as a nut provided at one side of the handling hole 214. For example, the first fastening member 213 is fixedly fastened to the first flange 211 with a clinching nut. The second fastening member 400 is formed as a bolt coupled to the first fastening member 213 through the fastening hole 302 of the coupling member 300.

Although not illustrated, the first fastening member 213 may be formed as a bolt coupled to the fastening hole 302 of the first flange 211, the second fastening member 400 may be formed as a nut provided on an outer surface of the coupling member 300 corresponding to the fastening hole 302 of the coupling member 300, and the first and second fastening members 213 and 400 may be coupled to each other.

Further, referring to FIGS. 2, 5, and 8, the end plate 201 further includes a bottom flange 216 and a side flange 217. The bottom flange 216 is bent in a direction away from the outermost unit cell 100 based on a second bent line L2 at a lower portion of the main body 210 to be connected to the main body 210. Thus, the bottom flange 216 substantially vertically faces the first and second flanges 211 and 212.

The bottom flange 216 is fixed to the pack bottom plate 301 with a fixing bolt 303 in the rechargeable battery pack (referring to FIG. 1). For example, by fixing the bottom flange 216 of the end plate 201 of the rechargeable battery modules 200 to the pack bottom plate 301, the rechargeable battery pack is formed.

The side flange 217 is bent in a direction away from the outermost unit cell 100 based on a third bent line L3 at the opposite sides of the main body 210 to be connected to the main body 210. Thus, side flanges 217 of opposite sides face each other to be fixed to the module side plate 202. For example, by fixing the side flange 217 of the end plate 201 to the module side plate 202, the rechargeable battery module 200 is formed.

The main body 210 of the end plate 201 is further provided with a reinforcing rib 218 that is extended in a direction (x-axis direction) parallel to the first and second flanges 211 and 212 and protruded in a direction away from the unit cell 100.

A plurality of reinforcing ribs 218 are provided, and are spaced apart from each other in a height direction (z-axis direction) of the main body 210. Thus, the main body 210 may have a uniform strength in the height direction (z-axis direction).

A reinforcing rib 219 adjacent to the first and second flanges 211 and 212 among the reinforcing ribs 218 is formed at opposite sides of the main body 210 to be shorter than the remaining reinforcing ribs 218 by a length difference (ΔL) therebetween (see FIG. 5). Since the adjacent reinforcing rib 219 is further spaced apart from the side flange 217 than the remaining reinforcing ribs 218, a basis floor area of the main body 210 near the second flange 212 may be secured depending on the length difference (ΔL).

The bottom flange 216 is vertically bent to have an elastic portion 221 that is substantially vertically deformed. By fixing the fixing bolt 303 to the pack bottom plate 301 through the elastic portion 221 of the bottom flange 216, vibration and impact transmitted to the rechargeable battery pack from the outside may be released at the elastic portion 221.

The end plate 201 further includes an edge-reinforcing rib 222 that is protruded from an edge at which the main body 210 and the bottom flange 216 are bent and connected and supports the main body 210 and the bottom flange 216. The edge-reinforcing rib 222 reinforces a bent strength of the bent main body 210 and the bottom flange 216.

Figure 9:
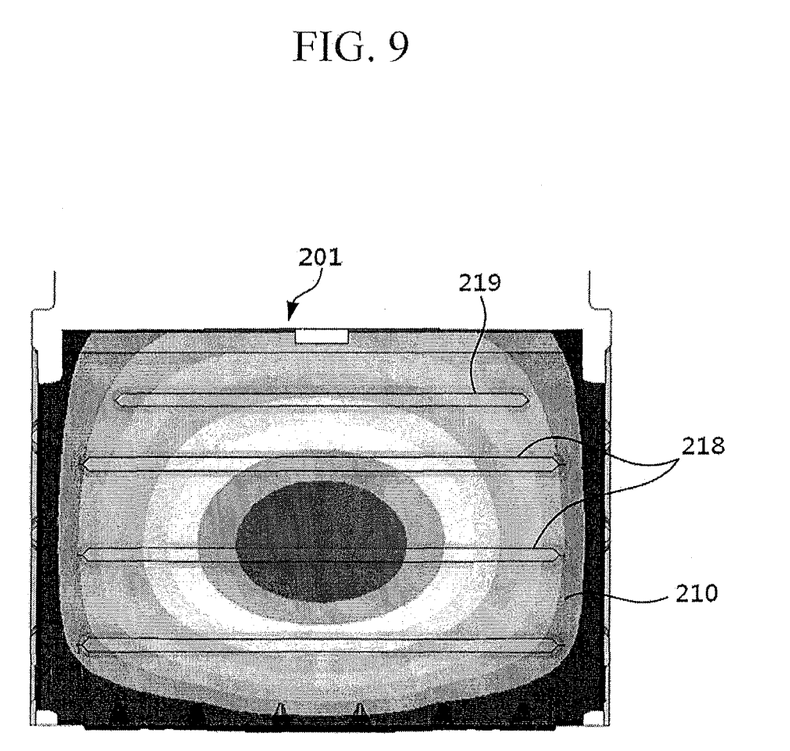
FIG. 9 illustrates a distribution diagram of a cell swelling force in an end plate applied to an exemplary embodiment.

FIG. 9 illustrates a distribution diagram of cell swelling force in an end plate applied to an exemplary embodiment of the present invention. Referring to FIG. 9, the cell swelling force operating on the end plate 201 applied to the rechargeable battery pack of the present exemplary embodiment is highest in the center portion of the main body 210.

The deformation amount of the end plate 201 due to the cell swelling force is a maximum in the center portion of main body 210, and gradually decreases from the center portion toward the outer side. For example, when the cell swelling force is applied to the center portion of the main body 210, it is transmitted to the outer side of main body 210.

In this case, since the bottom flange 216, the side flange 217, the bent portion 215, and the first and second flanges 211 and 212 that are provided at the outer side of the main body 210 resist the cell swelling force with the mechanical strength, the cell swelling force allows the center portion of the main body 210 to have the greatest deformation amount, and allows the deformation amount to decrease toward the outer side of the main body.

Since the bent portion 215 is provided at the upper portion of the main body 210 to reinforce the strength of the main body 210, it may be supplemented that the second flange 212 is provided at the opposite sides of the first flange 211 with a narrow second width W2.

As described above, as the deformation amount of the end plate 201 caused by the cell swelling force is concentrated on the center portion of the main body 210 and decreases toward the outer side of the main body 210, the electrical connection structure of the bus bar with respect to the unit cells 100 and the fastening structure of the coupling member 300 with respect to the end plates 201 of the unit module 200 may be stabilized without damage.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery pack comprising:
   a plurality of sets of unit cells adjacent to each other, wherein each unit cell includes a rechargeable battery;
   a plurality of rechargeable battery modules each configured to electrically connect a corresponding set of the unit cells to each other, wherein each of the rechargeable battery modules includes a pair of end plates respectively placed on outermost opposing sides thereof; and
   a coupling member connecting the end plates of the rechargeable battery modules to each other,
   wherein each of the end plates includes:
   a main body oriented toward an outermost unit cell among the unit cells of the respective rechargeable battery module;
   a bent portion having at least one bend away from a side of the main body, wherein at least a portion of the bent portion is bent away from the outermost unit cell such that there is a gap formed between the bent portion and the outermost unit cell;
   a first flange having a first width and extending from the bent portion to be connected to the coupling member; and
   a second flange having a second width smaller than the first width and extending from a middle portion of the first flange.

2. The rechargeable battery pack of claim 1, wherein each of the end plates includes:
   a first fastening member fixed to the first flange to be coupled to the coupling member; and
   a handling hole formed to pass through the main body at one side of the first fastening member.

3. The rechargeable battery pack of claim 2, wherein the coupling member has a plurality of fastening holes respectively formed over the first fastening members of the respective rechargeable battery module, and wherein the rechargeable battery pack further comprises a plurality of second fastening members configured to couple the coupling member to the rechargeable battery modules together with the first fastening members.

4. The rechargeable battery pack of claim 2, wherein each of the first fastening members is a bolt passing through the respective fastening hole to be connected to the corresponding second fastening member.

5. The rechargeable battery pack of claim 2, wherein each of the second fastening members is a bolt passing through the respective fastening hole to be connected to the corresponding first fastening member.

6. The rechargeable battery pack of claim 1, wherein the coupling member is perpendicular to the battery modules.

7. The rechargeable battery pack of claim 1, wherein the end plate includes:
   a first bent line having a bend at the bent portion to form the first and second flanges;
   a second bent line formed between the main body and the bent portion; and
   a third bent line having a bend in a direction opposite to a bent direction of the first and second bent lines at the bent portion between the first and second bent lines.

8. The rechargeable battery pack of claim 7, wherein the first and second bent lines are bent in a direction away from the corresponding unit cell, and
   wherein the third bent line is bent in a direction parallel to the unit cell.

9. The rechargeable battery pack of claim 1, wherein the main body includes a reinforcing rib extending in a direction parallel to the first flange and the second flange and protrudes in a direction away from the unit cell.

10. The rechargeable battery pack of claim 9, wherein the reinforcing rib is provided in plural to be spaced apart from each other in a height direction of the main body.

11. The rechargeable battery pack of claim 10, wherein a reinforcing rib adjacent to the first and second flanges is formed at opposite sides thereof to be shorter than the remaining reinforcing ribs by a length difference therebetween.

12. The rechargeable battery pack of claim 1, wherein each of the end plates includes:
   a bottom flange bent in a direction away from the outermost unit cell at a lower portion of the main body to face the first and second flanges to be fixed to a module side plate; and
   a plurality of side flanges bent in a direction away from the outermost unit cell at opposite sides of the main body to face each other to be fixed to the module side plate.

13. The rechargeable battery pack of claim 12, wherein the bottom flange includes a vertically bent elastic portion.

14. The rechargeable battery pack of claim 12, wherein the end plate includes an edge-reinforcing rib protruding from an edge at which the main body and the bottom flange are bent and connected to support the main body and the bottom flange.

15. A rechargeable battery pack comprising:
   a plurality of rechargeable battery modules each configured to electrically connect a plurality of unit cells to each other, wherein each of the rechargeable battery modules includes a pair of end plates respectively placed on outermost opposing sides thereof; and
   a coupler connecting the rechargeable battery modules to each other via the end plates,
   wherein each of the end plates includes:
   a main body;
   a first upper portion extending from the main body at least partially in a first direction; and
   a second upper portion extending from the first portion in a second direction crossing the first direction,
   wherein the second upper portion directly contacts and is connected to the coupler,
   wherein the first upper portion of each end plate includes a bent portion bent at an angle with respect to the main body, wherein at least a portion of the bent portion is bent away from the outermost unit cell such that there is an aira gap formed between the bent portion and the outermost unit cell, and
   wherein the second upper portion includes:
   a first flange having a first width and extending in the second direction,
   a second flange having a second width and extending from a middle portion of the first flange in the second direction, wherein the second width is smaller than the first width.

16. The rechargeable battery pack of claim 15, wherein an opening is formed in the second flange of each end plate, and wherein the end plates are connected to the coupler via the openings.

17. The rechargeable battery pack of claim 15, wherein the main body includes a reinforcing rib extending in a direction parallel to the first and second flanges and protrudes in a direction away from the unit cell.

18. The rechargeable battery pack of claim 17, wherein the reinforcing rib is provided in plural to be spaced apart from each other in a height direction of the main body.

19. The rechargeable battery pack of claim 1, wherein the first and second flanges are parallel to each other.

20. The rechargeable battery pack of claim 1, wherein the at least portion faces the outermost unit cell.

* * * * *